W. O. LONG.
HARROW.
APPLICATION FILED JULY 7, 1919.
1,394,030.
Patented Oct. 18, 1921.
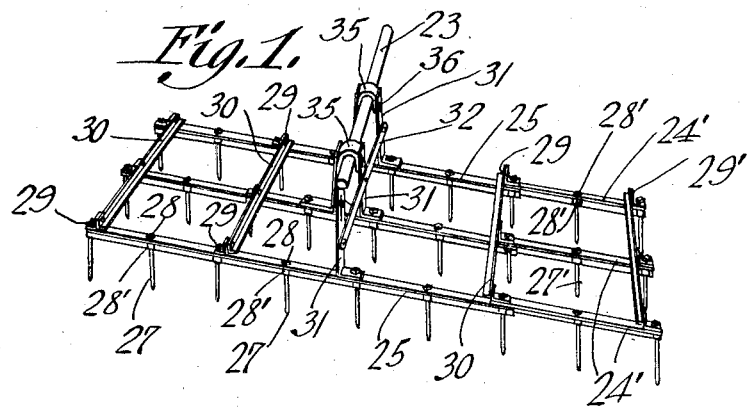
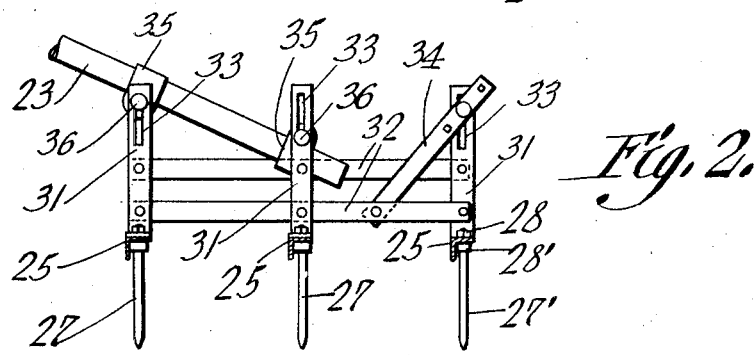
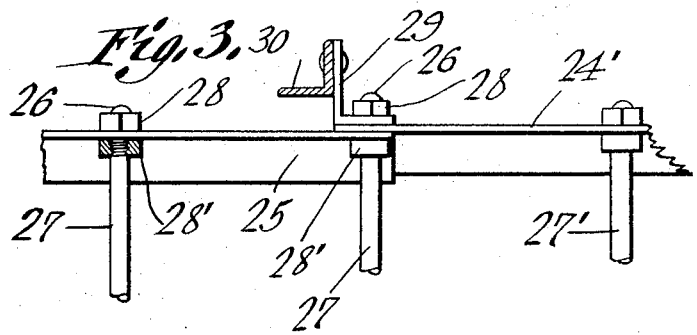
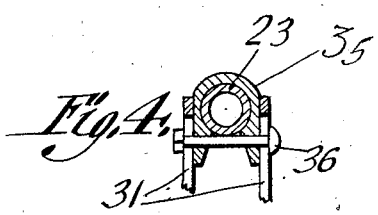
W. O. Long
Inventor
Witness
By C. A. Snow & Co.
Attorneys

UNITED STATES PATENT OFFICE.

WILLARD O. LONG, OF MANSFIELD, OHIO.

HARROW.

1,394,030.  Specification of Letters Patent.  Patented Oct. 18, 1921.

Original application filed July 8, 1918, Serial No. 243,848. Divided and this application filed July 7, 1919. Serial No. 309,138.

*To all whom it may concern:*

Be it known that I, WILLARD O. LONG, a citizen of the United States, residing at Mansfield, in the county of Richland and State of Ohio, have invented a new and useful Harrow, of which the following is a specification.

This invention relates to harrows and is a division of an application filed by me on July 8th, 1918, and which issued on September 2, 1919, as Patent No. 1,314,678.

One of the objects of the invention is to provide a harrow of simple and durable construction which can be used with either a two or a three bottom plow for the purpose of pulverizing the newly plowed soil without the necessity of trampling it.

Another object is to provide a harrow which can be enlarged readily when, for example, it is desired to use it with a three bottom plow instead of a two bottom plow.

A further object is to provide novel means for fastening the teeth to the bars of the harrow, the stems of the teeth constituting means for bolting the bars to certain of the parts of the harrow.

With the foregoing and other objects in view, which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention.

In the accompanying drawings the preferred form of the invention has been shown.

In said drawings—

Figure 1 is a perspective view of a harrow having the present improvements.

Fig. 2 is a section therethrough taken from front to rear.

Fig. 3 is an enlarged rear elevation of a portion of the harrow and showing an extension thereon.

Fig. 4 is a transverse section through one of the clamps.

Referring to the figures by characters of reference, 23 designates an arm or draw bar adapted to be attached in any manner desired to a plow structure or the like, and to the free end of this arm or bar is attached the harrow constituting the present invention. The harrow includes parallel angle strips 25 in which are secured threaded stems 26 projecting from the teeth of the harrow. A nut 28' is jammed on each of the threaded stems and one face of each nut fits snugly against the depending flange of the angle strip 25 so as to hold the tooth against rotation within said strip. Additional nuts 28 engage the stems above the angle strips and, when tightened, will press the lower nuts 28' tightly into the angles of the strips and securely fasten the teeth to the strips. Certain of the stems 26 are used for securing angle brackets 29 to the strips 25 and these brackets, in turn, are pivotally connected to strips 30 which are above and spaced from the strips 25.

The stem 26 of one tooth on each strip 25 can be used to engage the foot of a standard 31 and secure it to the strip. The standards are connected by parallel strips 32 pivotally attached thereto and longitudinal slots 33 are formed in the standards. A brace 34 is connected to one of the strips 32 and is adjustably secured to the slotted portion of the rear standard 31, thus to hold the strips 25 against rotation about their connections with the strips 30.

U-clamps 35 are interposed between the other standards 31, which are arranged in pairs, as shown, and these clamps embrace the arm or bar 23 and are held thereon by bolts 36 which also serve to secure the clamps adjustably to the standards.

The attachment can be used as well with a three bottom gang plow as with a two bottom plow because the width of the harrow can be increased readily. Such increase in width is effected by removing the nuts 28 from the stems 26 at one side of the harrow and placing on said stems extension strips 24' carrying teeth 27'. This arrangement has been shown in Figs. 1 and 3. Likewise the standards 31 can be shifted nearer the center of the harrow, if desired, by placing them on other stems 26 than those to which they had previously been secured.

Importance is attached to the fact that the strips 30 are pivotally engaged at points above the strips 25 by the brackets 29 because this results in the strips 25 swinging relative to said strips 30 when the strips 25 are adjusted angularly, thereby allowing the trash and soil to work under the strips without becoming hung and interfering with the action of the harrow.

What is claimed is:—

1. The combination with a harrow comprising parallel strips, and angle members supported upon the strips, of teeth having stems extending through the strips and angle members, means engaging the stems for securing the teeth, strips and angle members together, and connections between the angle members.

2. In a harrow the combination with strips, extension strips lapping the same, brackets, and connections between the brackets, of harrow teeth having threaded stems extending through the lapping portions of the strips and through the brackets, and means engaging the stems for holding the teeth, strips and brackets assembled.

In testimony that I claim the foregoing as my own, I have hereto affixed my signature in the presence of a witness.

WILLARD O. LONG.

Witness:
HERBERT D. LAWSON.